US006418390B1

United States Patent
Wahl

(10) Patent No.: US 6,418,390 B1
(45) Date of Patent: Jul. 9, 2002

(54) MOBILE TESTING FACILITY AND METHOD THEREOF

(76) Inventor: David M. Wahl, 260 Manor Rd., Bloomfield Hills, MI (US) 48304

( * ) Notice: Subject to any disclaimer, the term of this patent is extended or adjusted under 35 U.S.C. 154(b) by 0 days.

(21) Appl. No.: 09/405,344

(22) Filed: Sep. 24, 1999

(51) Int. Cl.⁷ .......................... G06F 19/00; G01G 19/00; G01B 5/20
(52) U.S. Cl. .......................... 702/113; 702/40; 702/173; 702/175; 33/551
(58) Field of Search .............................. 702/113, 33–35, 702/40, 163, 173–175, 141; 73/104–105, 146; 356/3.01, 3.02, 3.03; 33/551–555

(56) References Cited

U.S. PATENT DOCUMENTS

| 4,490,038 A | * | 12/1984 | Theurer et al. ............ 356/4.01 |
| 4,571,695 A | * | 2/1986 | Elton et al. ................. 702/140 |
| 4,741,207 A | * | 5/1988 | Spangler ....................... 73/146 |
| 4,781,058 A | * | 11/1988 | Arnberg ....................... 702/34 |
| 5,456,404 A | | 10/1995 | Robinette, Jr. et al. ..... 228/104 |
| 5,540,099 A | | 7/1996 | Harashima ................... 73/669 |
| 5,701,257 A | | 12/1997 | Miura et al. ................. 364/508 |
| 5,719,554 A | | 2/1998 | Gagnon ....................... 340/439 |
| 5,790,243 A | * | 8/1998 | Herr ............................ 356/5.1 |

* cited by examiner

Primary Examiner—Bryan Bui
(74) Attorney, Agent, or Firm—Young & Basile, P.C.

(57) ABSTRACT

A method and mobile unit facility is provided for testing the packaging of material during the transport of the material from one location to another location. The method includes instrumenting a unit of packaged material for measuring deflection and acceleration of the packaged material during the transport, loading the unit of packaged material into a bed of the mobile unit facility and filling the remainder of the bed with weighted material which is weighted and sized to simulate other units of the actual packaged material, and then driving the mobile unit facility from the one known location to the other location while recording deflection and acceleration data of the unit of packaged material.

8 Claims, 1 Drawing Sheet

MOBILE TESTING FACILITY AND METHOD THEREOF

FIELD OF THE INVENTION

This invention relates to a method for sensing vibration on packaged material during transport between known destinations.

BACKGROUND OF THE INVENTION

It is known to take measurements of a vehicle as it is driven over a road surface. Accelerometers have been placed on the vehicle at such locations as the axial shaft or wheel to monitor the vibration applied to the vehicle. The information gathered by the accelerometers are later imputed into a road simulator to measure vibrations applied to a test vehicle. It is further known to measure the quality of pavement surfaces as disclosed in U.S. Pat. No. 5,790,243 by mounting an amplitude modulated laser scanning system to a motor vehicle which scans the pavement surface as the motor vehicle travels over it. Although this profile information can be used to determine the quality of the pavement surface and its affect on the vehicle, there is no system or method that provides a means of testing the packaged material that is transported by the vehicle from one known starting point to a known destination. A manufacturer of packaged material does not get adequate information of the quality of his packaging from current vehicular road simulators. As a result, the manufacturer generally resorts to shaker tables to test the quality of the packaging of his material.

Shaker tables are very capable of generating various directional vibrations. The industry has seen cam driven, single axis and other multi-axis devices built as an attempt to duplicate real world input. The result of these machines have been mixed, and in most cases give a false representation of the real world. Data acquisition has been limited with no comprehension of the physics and engineering mechanics of truck suspensions. The data that has been collected to date does not comprehend the weight of the load and suspension types. Truck suspensions are sensitive to the weight in hauling. A truck having a 40,000 lb. load will ride much gentler than when carrying empty. The shaker tests need to correlate with the truck weight distribution. The other downfall of current testing is that the packaging manufacturer has no intuitive feel between the test and the real world. This disjointed interpretation usually will cause over or under design scenarios in packaging and will increase the cost of the packaging. Therefore, it would be desirable to provide a mobile test facility which focuses on data collection and real world interpretation with the physics and engineering mechanics in mind which more realistically measures the effects of the transport of the packaged material from one location to another.

SUMMARY OF THE INVENTION

The present invention provides a mobile test facility and procedure for providing real world testing of packaged material during shipment from one location to its final destination. The procedure includes acquiring one or multiple units of packaged material from the customer and instrumenting the packaged material for reading acceleration and/or strain in multiple directions. The unit of packaged material is then loaded onto the. truck bed of the mobile test facility. The remainder of the truck bed is filled with weighted material that represents and simulates the actual units of packaged material. Visual cameras are set directed at points of interest within the trailer. Monitors lie within the truck cab for visual observation and recording. The mobile test facility is further instrumented to determined the road profile during the test. The mobile test facility is then driven the actual route from originating location to final destination point. During the actual route data is recorded of any movement of the actual unit of material. Upon completion of driving the actual route, the data is processed to provide both visual and analog data to the customer.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWING

The description herein makes reference to the accompanying drawings wherein like reference numerals refer to like parts throughout the several views, and wherein.

DESCRIPTION OF THE PREFERRED EMBODIMENT

Figure 1:
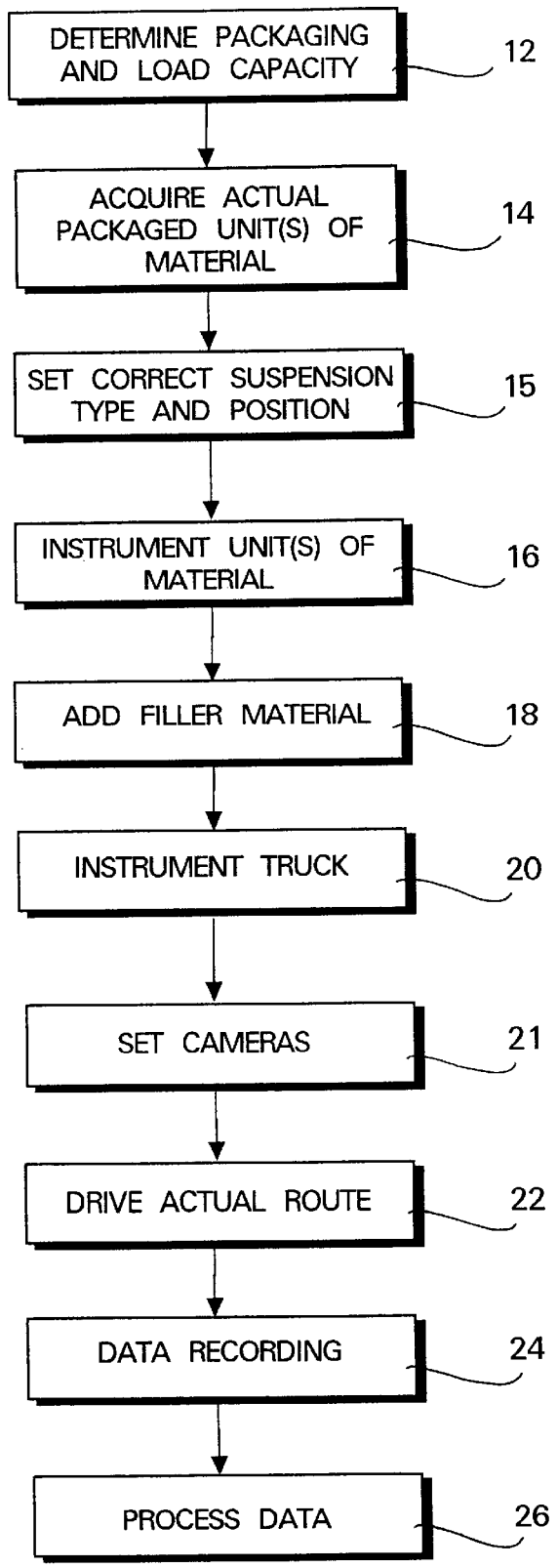
FIG. 1 is a flow diagram of a method for providing mobile testing of packaged material according to the present invention.

The flow diagram in FIG. 1 illustrates the process for testing the packaging and shipping of a particular product from the manufacturing, assembly, or farming starting point to its final destination and to determine an improved method for packaging an article so that it withstands handling and transporting of the article to its final destination.

The first step 12 is to verify the customer's product, his current packaging and the anticipated quantity for shipping. When determining packaging, it is necessary to know both packaging for individual articles as well as a shipping unit encasing multiple articles. For example, a carton of eggs may be sold in the stores in a carton holding twelve eggs, but as shipped may be placed in a crate holding a hundred dozen cartons of the eggs. In another example, when shipping engines from one manufacturing plant to the assembly plant, a pallet holding multiple engines may be used and be considered a unit of material. Therefore, for use in this testing system and using the examples previously discussed, a crate of eggs or a pallet of engines would be considered one unit of material.

The next step, designated as 14 would include acquiring at least one unit of material but usually less than an entire shipment of material for testing. Of course, the testing can be done with an entire shipment of material when packaging has been finalized or during a normal delivery of the material, but preferably a minimum number of units is tested to minimize the risk of damage to the packaged material.

In step 16, the unit or units of material are instrumented with accelerometers and optionally with other strain gauges. The accelerometers may be the type to measure single and multi-axis movement. The strain gauges may also measure single and multi-axis deflections. The instrumented units of material are then strategically placed within the bed of the mobile test facility at predetermined locations within the bed which may, from previous experience, be located at a location where there is high vibrations or representative vibrations during the road test. In most cases this location is over the rear axles or near the back door of the bed. The instrumented units of material will then be hooked up to a data recorder to read and save the data during the road test.

The mobile test facility is a conventional truck having a 48 or 53 ft. drop deck covered van. This truck is just one type of vehicle which may be used for the mobile test facility. Other conventional delivery vehicles may be considered. The bed or trailer of the mobile test facility is equipped with pneumatic or mechanical suspensions (step 15).

Prior to installing the instrumented units of material, one of the units of material is weighed and measured so that the filler material closely represents the subject units. In step 18, filler material is used to fill the vacant portions of the truck bed. The filler material is weighted and sized to closely represent the units of material received from the customer.

In step 20, the weighted material may be instrumented similarly to the actual units of material. If instrumented, the instrumentation will also be connected to the data recorder. The truck bed will also be instrumented to take acceleration data in both the lateral and longitudinal directions. A pair of lasers mounted on the vehicle measures the pavement surfaces during the road test. The lasers will provide a road profile of the route. In addition, high speed cameras may be used to photograph the road at predetermined intervals. The truck bed may further be instrumented with video cameras and recorders preferably focused on the actual unit of material to provide visual data to the customer of his units of material during the road test (step 21).

The commencement of the testing procedure will preferably be located at the customer's assembly or manufacturing plant or other location designated by the customer. The fully loaded and instrumented truck will follow the actual route (step 22) taken by the customer to reach his final destination, whether that is another assembly plant, distribution center, store, etc. This actual route taken by the mobile test facility will provide a more accurate testing procedure, providing more accurate data than shaker tables or other prior art testing facilities. The data parameters are read (step 24) at predetermined intervals which visually records the road plus reads the road profile. The data also includes multi-directional accelerations and strains of the actual units of material. Data from the weighted filler material may optionally be taken also. The data will be stored on an onboard computer processing unit (CPU) and on the closed circuit monitors. Upon reaching the final destination, the mobile test facility will discontinue data recording.

The raw data will then be processed (step 26). A report of the findings will be delivered on CD and VHS format to the customer. The CD will consist of power spectral density curve from the input of the unit of material for the entire trip. A selection of specific output will be formatted to show accelerations, road profiles, and still shots of the road condition that caused the accelerations. Movie files will also be included as a part of the report so that customer can review them along with the report on his/her personal computer.

This mobile test facility and procedure of the present invention provides a more accurate testing means to determine the adequacy of current packaged materials or the requirements of future packaged materials. During the test procedure of the current invention the customer does not expose an entire load of material to the risk of damage. The testing is more representative because the actual route in actual shipping packaging conditions is tested.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of testing packaging of material comprising the steps of:

providing a mobile unit having a bed for transporting the material;

acquiring a unit of packaged material;

instrumenting the unit of packaged material for accelerated movement;

loading the unit of packaged material at a predetermined location within the bed;

driving an actual route from a starting location to a delivery location;

reading and storing data of accelerated movement and strain during the driving step; and processing the data to obtain useful information regarding the adequacy of the packaging of the material.

2. The method of claim 1 further comprising the step of:

filling the bed with filler weighted material which represents other units of the material after loading the unit of packaged material in the bed.

3. The method of claim 2 further comprising the steps of:

instrumenting the mobile unit with lasers to read a road profile during the driving step and reading and storing road profile data.

4. The method of claim 3 further comprising the step of:

instrumenting the mobile unit with accelerometers for measuring road deflection.

5. The method of claim 2 further comprising the step of:

mounting video cameras in the bed and taking visual data therefrom of the unit of packaged material.

6. The method of claim 2 further comprising the step of:

acquiring at least two units of packaging material and instrumenting the at least two units of packaging material.

7. The method of claim 2 further comprising the steps of:

instrumenting the filler weighted material and reading and storing data of accelerated movement of the filler weighted material during the driving step.

8. The method of claim 1 further comprising the step of:

loading the unit of packaged material over the rear axles of the mobile unit.

* * * * *